Figure 1:
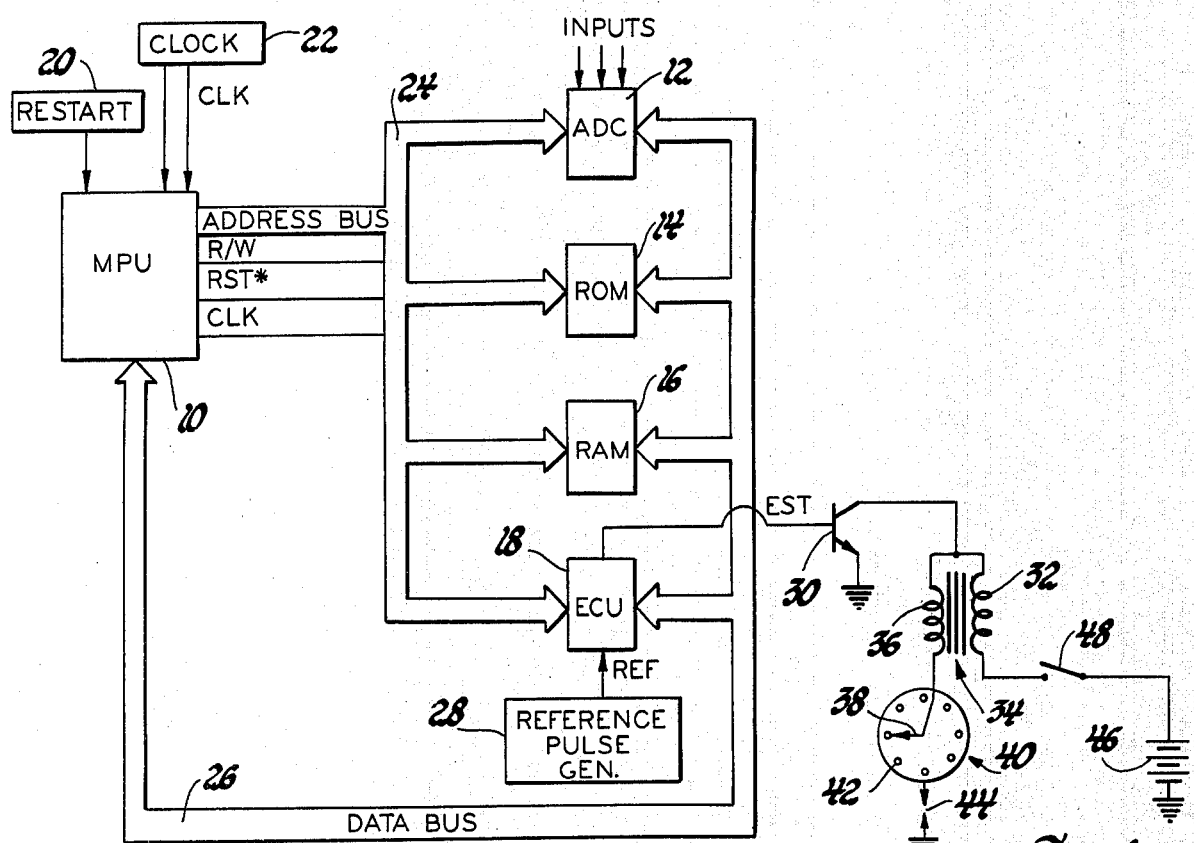
Figure 1:
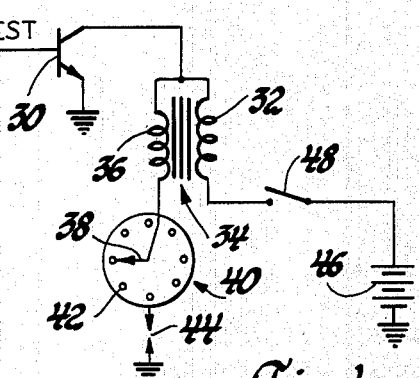

United States Patent [19]

Luckman et al.

[11] 4,351,306
[45] Sep. 28, 1982

[54] ELECTRONIC IGNITION SYSTEM

[75] Inventors: James E. Luckman, Anderson; William P. Winstead, Alexandria; John L. Kastura, Kokomo, all of Ind.

[73] Assignee: General Motors Corporation, Detroit, Mich.

[21] Appl. No.: 267,269

[22] Filed: May 26, 1981

[51] Int. Cl.³ .................................................. F02P 3/04
[52] U.S. Cl. ..................................... 123/609; 123/417
[58] Field of Search ............... 123/417, 418, 422, 609, 123/644

[56] References Cited

U.S. PATENT DOCUMENTS

| | | | |
|---|---|---|---|
| 4,174,696 | 11/1979 | Jundt et al. | 123/644 |
| 4,231,091 | 10/1980 | Motz | 123/417 X |
| 4,267,813 | 5/1981 | Hohne et al. | 123/609 |
| 4,298,941 | 11/1981 | Furuhashi | 123/609 X |
| 4,300,518 | 11/1981 | Petrie | 123/609 |
| 4,303,977 | 12/1981 | Kobashi et al. | 123/609 X |
| 4,309,973 | 1/1982 | Tamura | 123/609 |

*Primary Examiner*—Tony M. Argenbright
*Attorney, Agent, or Firm*—Howard N. Conkey

[57] ABSTRACT

The values of dwell and ignition timing signals from which ignition dwell and spark timing are provided are controlled to minimize power dissipation in an electronic ignition system and to ensure that adequate dwell times are provided during engine acceleration conditions and large advance angle increases. The dwell signal is increased from a static dwell value during steady state engine operation to a higher value in response to sensed engine accelerating conditions and the change in the spark advance between ignition events is limited to ensure that an adequate dwell period is provided.

4 Claims, 7 Drawing Figures

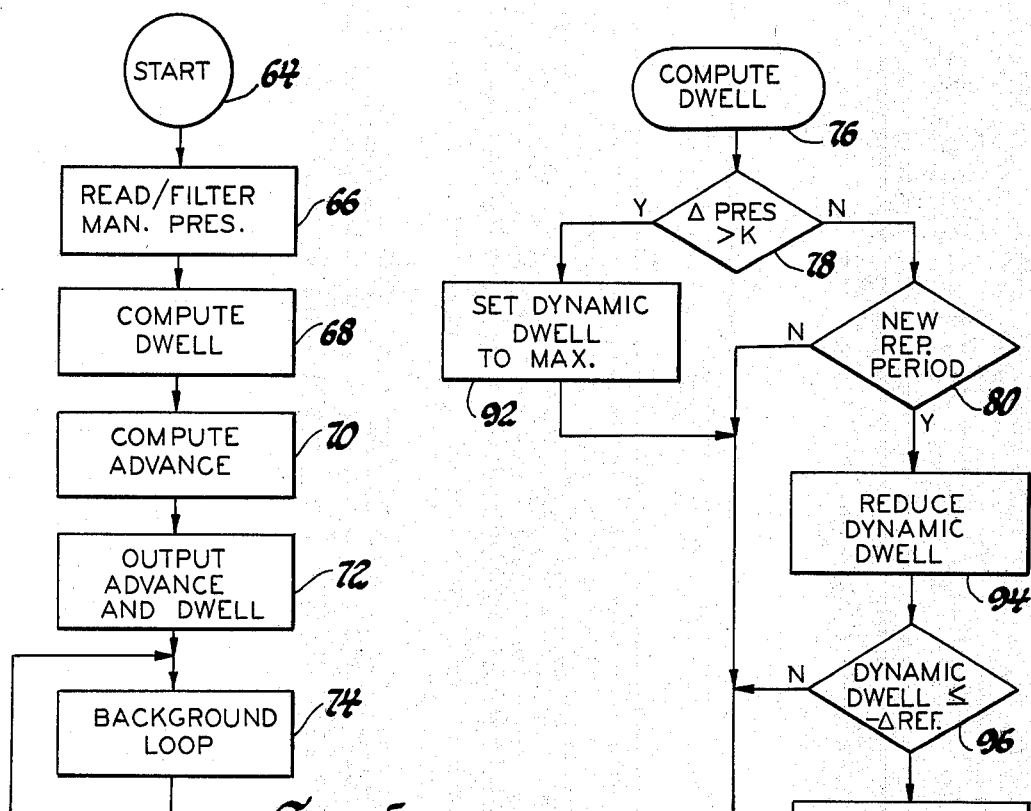
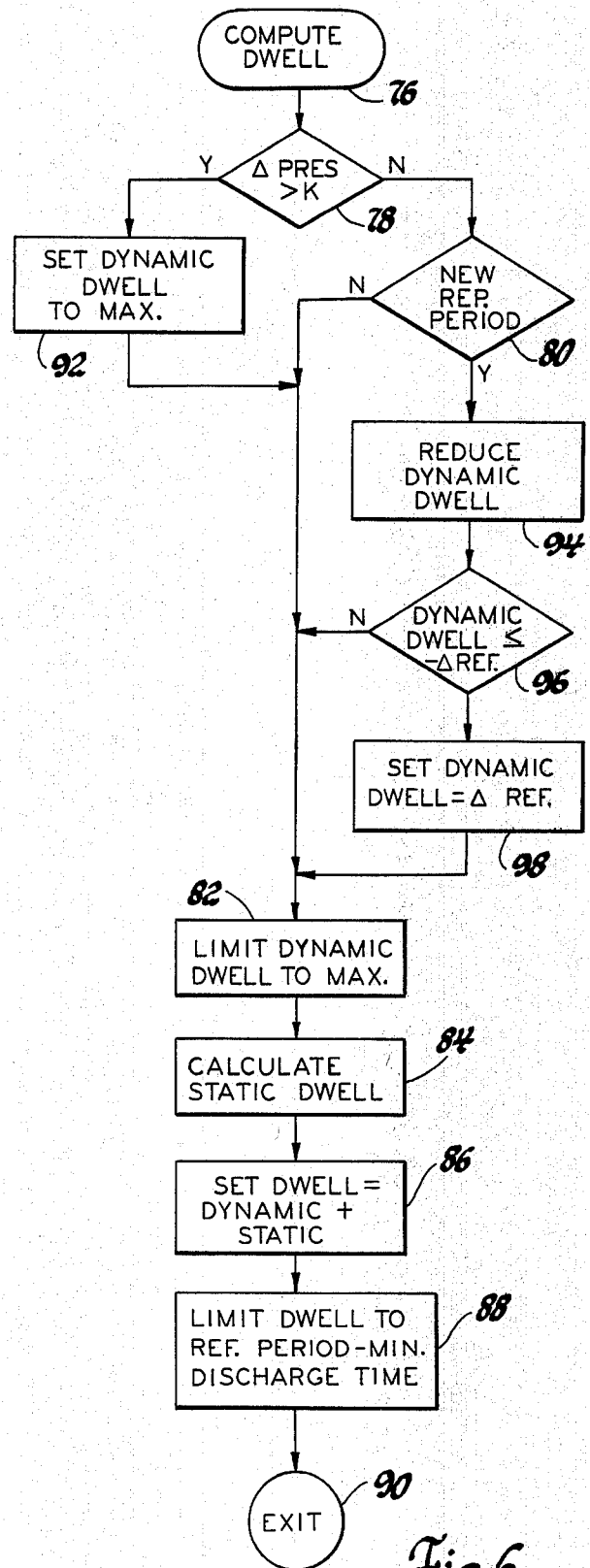
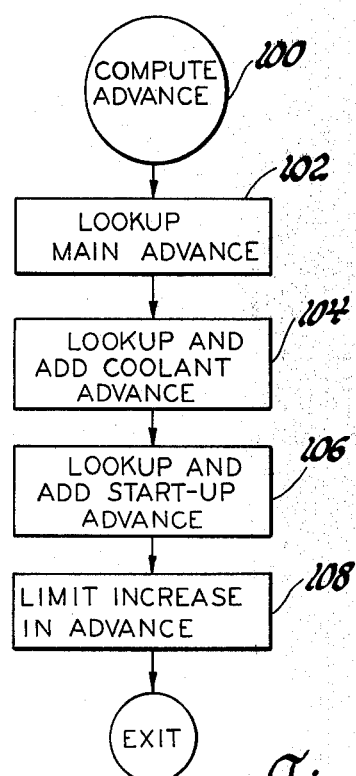

ELECTRONIC IGNITION SYSTEM

This invention relates to an electronic ignition control system for controlling dwell and spark timing in an internal combustion engine.

Known electronic spark control systems for spark ignited internal combustion systems include systems in which reference pulses are provided at predetermined angular positions of the crankshaft relative to engine top dead center and position pulses are generated intermediate the reference pulses so that by counting the position pulses relative to the reference pulses, the absolute position of the crankshaft relative to the reference pulses is always known. While spark control can be based on known crankshaft angles for both static and dynamic engine operating conditions, this form of spark control system requires complex sensors for providing the angular resolution required for spark timing control.

Another system for providing spark control includes the provision of reference pulses at predetermined crankshaft angular positions relative to top dead center positions of the engine but does not include the sensing of crankshaft rotation intermediate the reference pulses so that the crankshaft position is absolutely known only at the occurrence of the reference pulses. To provide for ignition dwell and spark timing, these systems predict the time period between reference pulses based on the actual time period between prior reference pulses. From this, the point in time that the next reference pulse will occur is predicted. Ignition dwell and spark timing are then provided by determining the times relative to the predicted time of occurrence of the next reference pulse that result in the required dwell time and spark advance angle. During steady state engine operating conditions, these systems provide the ignition dwell and spark timing as desired relative to the reference pulses. However, if the engine accelerates, the actual time to the next reference pulse is shortened from the predicted time. This results in an error in the time relationship of the spark timing signal relative to the reference pulse. In the prior systems, if upon the occurrence of a reference pulse it is determined that the actual period between reference pulses is less than the predicted period, the spark timing error is minimized by updating the spark time relative to the new reference pulse so that excessive retarding of the spark ignition does not occur. However, this may result in a severe shortening of the dwell period so that the energy stored in the ignition coil is insufficient to provide spark ignition. In order to prevent a shortening of the dwell period to the extent where there is insufficient energy in the ignition coil to initiate spark ignition, the prior systems provide for a dwell period that is long enough so that even though shortened as a result of engine acceleration, the resulting actual dwell period is adequate to ensure spark ignition. However, in this form of system, during steady state conditions the dwell period is longer than required resulting in excessive power dissipation in the electronic ignition control system.

In ignition systems as above described, the dwell period can also be shortened from the desired dwell period as a result of a change in the engine operating condition suddenly calling for a larger advance angle of ignition. For example, if during the dwell period the engine condition changes calling for a substantially increased advance angle, the dwell period will be shortened in order to provide for the spark ignition at the new advance angle. This may result in the initiation of spark ignition before adequate energy is stored in the primary winding of the ignition coil to provide for spark ignition.

It is the general object of this invention to provide an improved electronic ignition system wherein the ignition dwell period is controlled so as to minimize power dissipation and so as to provide adequate dwell during periods of engine acceleration.

It is another object of this invention to provide an electronic spark control system in which ignition dwell and spark timing are provided in timed relationship to reference pulses generated at predetermined crankshaft angles relative to top dead center and wherein the dwell periods are controlled so as to minimize power dissipation while providing required dwell for engine accelerating conditions.

It is another object of this invention to provide for a dwell control signal in the above-described systems that calls for a static dwell period during steady state engine operating conditions and which is increased by a dynamic dwell period during sensed engine accelerating conditions so that required dwell is provided during engine acceleration conditions.

It is another object of this invention to provide for an electronic ignition control system wherein the change in advance angle is limited to prevent excessive shortening of the dwell period.

Figure 2:
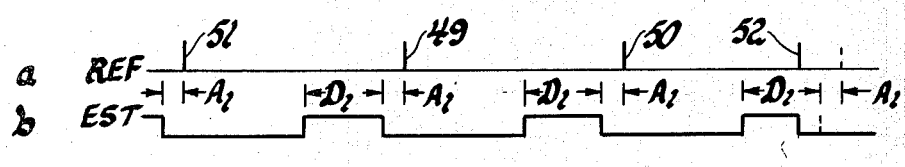
Figure 3:
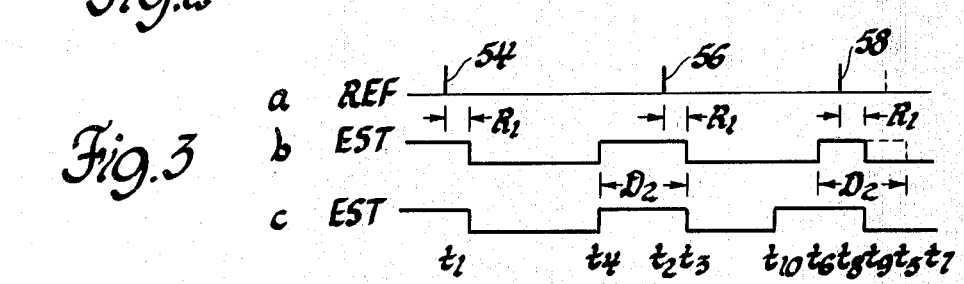
Figure 4:
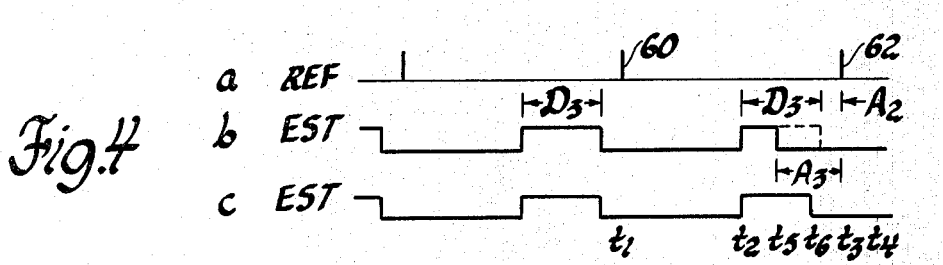

The following description of a preferred embodiment of the invention may be best understood by reference to the drawings in which:

FIG. 1 is a block diagram of an electronic ignition system incorporating the principles of this invention;

FIGS. 2 thru 4 illustrate various spark timing waveforms; and

FIGS. 5 thru 7 are flow diagrams illustrative of the operation of the electronic ignition of FIG. 1 in accord with the principles of this invention.

Referring to FIG. 1, the electronic ignition system incorporating the principles of this invention is illustrated with respect to a digital computer based system that includes a microprocessing unit (MPU) 10, an analog-to-digital converter (ADC) 12, a read-only memory (ROM) 14, a random access memory (RAM) 16 and an engine control unit (ECU) 18. The MPU 10 may take the form of the microprocessor model MC-6800 described in the MC-6800 Microprocessor Application Manual available from Motorola Semiconductor Products, Inc., Phoenix, Ariz. and incorporated herein. The ADC 12, the ROM 14 and the RAM 16 may be any of a number of commercially available units compatible with the MPU 10. The MPU 10 receives inputs from a restart circuit 20 and generates a restart signal RST* for initializing the remaining components of the system. The MPU 10 also receives inputs from a clock 22 and generates the required timing signals for the remainder of the system. The MPU 10 also provides a R/W signal to control the direction of data exchange and a clock signal CLK to the rest of the system. The MPU 10 communicates with the rest of the system via a 16 bit address bus 24 and an 8 bit bi-directional data bus 26.

The ADC 12 preferably includes both the analog and digital subsystems normally associated with such units but if desired the MPU 10 may be programmed to perform the function of the digital subsystem as described in application note AN-757, Analog to Digital Conversion Techniques with the M6800 Microprocessor System available from Motorola Semiconductor Products, Inc., Phoenix, Ariz. and incorporated herein.

The ADC 12 responds to a plurality of engine parameters including manifold pressure and coolant temperature. The conversion process is initiated on command from the MPU 10 which selects the input channel to be converted. At the end of the conversion cycle, the ADC 12 generates an interrupt after which the data is read over the data bus 26 on command from the MPU 10.

The ROM 14 contains the program steps for operating the MPU 10, the engine calibration parameters for determining the appropriate ignition dwell time and also contains ignition timing data in lookup tables which identify as a function of engine parameters the desired ignition angle relative to a reference pulse. The lookup table data may be determined experimentally or derived empirically. The MPU 10 may be programmed in a known manner to interpolate between the data at different entry points if desired. Based on engine speed, the ignition angle is converted to time relative to a reference pulse producing the desired ignition angle. The control words specifying a desired dwell time and ignition time relative to engine position reference pulses are periodically transferred by the MPU 10 to the ECU 18 for generating an electronic spark timing (EST) output signal. The ECU 18 also receives the aforementioned input reference pulses designated REF from a reference pulse generator 28 which are indicative of engine crankshaft position and which have a repetition rate proportional to engine speed. The ECU 18 computes the time interval between REF pulses and this information is accessible to the MPU 10 for use in developing the dwell and ignition time control words. The pulse generator 28 may be of any known type such as an electromagnetic transducer which responds to rotation of the distributor shaft or other input to provide a train of pulses which occur at a predetermined angle prior to top dead center position. For example, in an 8-cylinder engine, known transducers produce a reference pulse every 90° of crankshaft rotation which defines a fixed ignition angle.

The EST output signal of the ECU 18 is coupled to a switching transistor 30 connected with the primary winding 32 of an ignition coil 34. The secondary winding 36 of the ignition coil 34 is connected to the rotor contact 38 of a distributor generally designated 40 which sequentially connects contacts 42 on the distributor cap to respective spark plugs, one of which is illustrated by the reference numeral 44. The primary winding 32 is connected to the positive side of the vehicle battery 46 through an ignition switch 48. The transistor 30 is switched ON and OFF to cause spark firing energy to be developed to fire the spark plugs of the engine. The transistor 30 is turned ON when the EST output of the ECU 18 switches to a high voltage state and is switched OFF when the EST output of the ECU 18 returns to the low voltage state at which time the particular spark plug selected by the distributor 40 is fired. The duration of the high voltage state represents the EST signal and is the dwell period for energizing the primary winding 32.

The ECU 18 is responsive to the dwell and ignition timing words provided by the MPU 10 and the reference pulse generator 28 to provide the EST signal in timed relation to the reference pulses REF to provide the desired dwell period and spark ignition angle. The ECU and its operation may be as described in the U.S. Pat. No. 4,231,091 issued on Oct. 28, 1980, to Phillip R. Motz which is assigned to the assignee of this invention and incorporated herein. As described in this patent, the ECU 18 responds to the dwell and ignition timing words provided by the MPU 10 to provide the EST output relative to the predicted time of occurrence of the REF pulses, the prediction being based on the last actual measured period between REF pulses. In this type of system, when engine acceleration occurs, the time relationship between the EST signal and the reference pulses REF vary from the desired relationship called for by the MPU 10. In the system described in the above referenced patent, when an error is detected between the actual time of occurrence of a reference pulse REF and the predicted time of occurrence of the reference pulse REF, as a result of engine acceleration, the spark ignition angle error is caused to be minimized. This is illustrated in the FIGS. 2 and 3.

First referring to FIGS. 2a and 2b, there is illustrated an engine operating condition wherein the MPU 10 provides a spark timing word corresponding to an advance ignition time $A_1$ relative to the reference pulse and further calls for a dwell time $D_1$. Upon the occurrence of the reference pulse 49 at time $t_1$, the ECU 18 predicts the time of occurrence $t_2$ of the next reference pulse 50 based on a predicted period $t_2$ minus $t_1$ between reference pulses. This predicted period is based on the actual measured period between the reference pulse 49 and the prior reference pulse 51. The ECU 18 then determines the time $t_3$ at which spark ignition is to occur based on the predicted time of occurrence of the reference pulse 50 and the called for advance time $A_1$. The ECU 18 then establishes the time $t_4$ at which the EST signal is to go high prior to the spark ignition time $t_3$ in order to provide the desired dwell time $D_1$. Thereafter, at time $t_4$, the ECU 18 provides the EST signal to the transistor 30 which conducts to allow current to build up in the primary winding 32. Thereafter at time $t_3$, the EST signal is terminated to initiate spark ignition at the time $A_1$ prior to the predicted time of occurrence $t_2$ of the reference pulse 50. Assuming the engine is at steady state running speed, the reference pulse 50 actually occurs at the time $t_2$ as predicted so that the spark ignition was provided at the called for advance angle $A_1$.

At time $t_2$, the aforementioned cycle is repeated based on the actual measured time period $t_2$ minus $t_1$ between the reference pulses 49 and 50. Based on this time, the ECU 18 predicts that the next reference pulse 52 will occur at time $t_5$ thereby calling for the EST signal to be generated at time $t_6$ and terminated at time $t_7$ in order to produce the desired dwell time $D_1$ and advance time $A_1$. However, after the reference pulse 50, the engine is accelerated so that the next reference pulse 52 occurs at a time $t_8$ prior to the predicted time $t_5$ and prior to the time $t_7$ at which the ignition event was to take place. The ECU 18 senses the error in the estimated time of occurrence of the reference pulse 52 and minimizes ignition timing error by adjusting the time at which the spark ignition is to take place. Since the ignition event was to be initiated at a time $A_1$, in advance of the reference pulse 52, the ECU adjusts the time at which the EST signal is to terminate resulting in an immediate termination of the EST signal to initiate spark ignition. This reduces the error that otherwise would have occurred in the ignition angle by the amount represented by the time $t_7$ minus $t_8$. While this event minimized the ignition timing error, it can be seen that the dwell period is shortened by the time $t_7$ minus $t_8$. If the dwell control word supplied to the ECU 18 by the MPU 10 was the precise time required for the primary winding 36 to be charged to the desired energy level to initiate ignition, the resulting dwell time between times $t_6$ and $t_8$ may be insufficient to cause ignition resulting in misfiring of the engine. It has previously been suggested that the dwell control word provided by the MPU 10 always be made large enough, taking into consideration the maximum possible truncation of the dwell resulting from engine acceleration, so that the resulting actual dwell time after being shortened during engine acceleration is always adequate to provide spark ignition. However, during steady state engine conditions, this would result in a longer dwell period than required resulting in excessive power dissipation.

FIGS. 3a and 3b represent another condition where the dwell may be shortened as a result of engine acceleration. This condition results when the MPU 10 calls for a retarded ignition angle relative to the reference pulses. In this example, the MPU 10 provides a spark timing word to the ECU 18 corresponding to a retard time $R_1$ relative to the reference pulses and a word calling for a dwell time $D_2$. In the same manner as described with respect to FIG. 2, after the occurrence of the reference pulse 54 at time $t_1$, the ECU predicts the time of occurrence $t_2$ of the next reference pulse 56 and establishes the time $t_3$ at which spark ignition is to occur to obtain the retard time $R_1$ and the time $t_4$ at which the EST signal is to go high in order to provide the dwell time $D_2$. Thereafter at time $t_4$, the ECU 18 provides the EST signal to the transistor 30 which conducts to begin energizing the primary winding 32 of the ignition coil 34. At time $t_2$ and assuming a steady state engine speed, the next reference pulse 56 occurs as predicted and at time $t_3$ the electronic spark timing signal is terminated to initiate spark ignition.

The aforementioned cycle is then repeated based on the actual measured time period $t_2$ minus $t_1$ between the reference pulses 54 and 56. Based on this time, the ECU 18 predicts the next reference pulse 58 will occur at time $t_5$ thereby calling for the EST signal to be generated at a time $t_6$ and terminated at time $t_7$ in order to produce the desired dwell time $D_2$ and retard time $R_1$. However, after the reference pulse 56, the engine is accelerated so that the next reference pulse 58 occurs at a time $t_8$ prior to the predicted time $t_5$. The ECU 18 senses the error in the estimated time occurrence of the reference pulse 58 and adjusts the time to terminate the EST signal to the time $t_9$ to provide the called for retard time $R_1$. While this procedure prevented ignition timing error, the dwell period was shortened by the time $t_7$ minus $t_9$. If the dwell time $D_2$ represented the time required for charging the primary winding 32 to the required energy level to cause spark ignition, the shortened dwell time may be inadequate to produce the required energy to initiate spark ignition thereby resulting in misfiring of the engine.

As in the case of FIG. 2b, if the called for dwell period is large enough so that when it is shortened as a result of engine acceleration it is still long enough for the primary winding 32 to be charged to the required energy level, the resulting dwell period is longer than required during steady state engine operation thereby resulting in excessive power dissipation.

Another instance in the system as illustrated in FIG. 1 where the called for dwell period may be shortened is illustrated in FIGS. 4a and 4b. Referring to these figures, it is assumed that upon the occurrence of a reference pulse 60 at time $t_1$, the MPU 10 provides dwell and ignition timing words to the ECU 18 calling for the generation of the EST signal at time $t_2$ and termination of the EST signal at time $t_3$ producing a desired dwell time $D_3$ and advance time $A_2$ relative to a predicted time of occurrence $t_4$ of the next reference pulse 62. After the time $t_2$ and during the EST signal, the engine operating condition changes. The MPU 10 senses the change and determines a new spark advance time $A_3$ relative to the predicted time of occurrence $t_4$ of the reference pulse 62. The ECU 18 is responsive to this time to establish a new time $t_5$ at which the EST signal is to be terminated. As can be seen, this results in a dwell period that is shortened by the time $t_3$ minus $t_5$ which may result in a dwell signal insufficient to cause spark ignition.

In accord with this invention, the MPU 10 provides dwell and spark timing words representing the required dwell time and spark advance times relative to the predicted time of occurrence of the reference pulses that minimizes the power dissipation in the electronic ignition system and provides adequate dwell time during periods of engine acceleration or when large increases of advance angles are called for. This is accomplished by the MPU 10 in accord with the program steps stored in the ROM 14 and as illustrated in the FIGS. 5, 6 and 7.

Referring first to FIG. 5, the general program for determining the dwell and ignition timing words is illustrated. This routine is executed each 12½ milliseconds as established by a timer within the ECU 18 which provides an interrupt signal to the MPU 10 for initiating operation of the routine each 12½ milliseconds. When one of these time interrupt signals is generated, the routine is entered at point 64 and proceeds to a step 66 where the old value of filtered manifold pressure is saved and a new filtered value is established in accord with a measured value of manifold pressure provided to the ADC 12. The program then proceeds to a step 68 where the MPU 10 computes a dwell control word to be supplied to the ECU 18 and having a value determined in accord with the principles of this invention. From step 68 the program proceeds to a step 70 where the MPU 10 computes an ignition advance time word relative to the predicted time of occurrence of the next reference pulse based on the current engine operating conditions including speed. The program then proceeds to a step 72 where the MPU 10 provides the determined ignition advance time and dwell time words to the ECU 18. Thereafter, the program exits the spark timing control routine and enters a background loop 74. Upon the occurrence of the next 12½ millisecond interrupt, the routine of FIG. 5 is repeated.

The step 68 where the dwell time is computed in accord with the principles of this invention is illustrated in FIG. 6. In general, the routine of step 68 provides a dwell time word having a value established by the sum of two components. The first component is a static dwell time which is generally equal to the dwell time required to charge the primary winding 32 to the required energy level for spark ignition. The second component of the dwell time is a dynamic dwell time that is added to the static dwell time when engine accelerating conditions are detected which may result in a shortening of the called for dwell period by the ECU 18. Generally, the magnitude of the dynamic dwell time is at least equal to or greater than the time that the EST signal may be shortened by the ECU 18 during engine accelerating conditions as illustrated in FIGS. 2a and 2b and FIGS. 3a and 3b. Since the dynamic dwell is added to the static dwell only during conditions where the dwell period may be shortened by the ECU 18, the dwell period during steady state engine conditions is not excessive so as to minimize the power dissipation in the electronic ignition system while yet providing adequate dwell during static engine conditions, such as during engine acceleration, so as to ensure adequate energy storage in the primary winding 32 to provide for spark ignition.

The program routine for computing the dwell period is entered at step 76 and proceeds to a decision point 78 where the difference between the filtered manifold pressure determined at step 66 of FIG. 5 and the old value of the filtered manifold pressure saved at step 66 is compared to a reference value K representing a predetermined value of engine acceleration. Assuming that the engine is substantially steady state, the program proceeds from the decision point 78 to a decision point 80 where the program determines whether or not a new reference pulse has occurred since the last 12½ millisecond interrupt period. Assuming a new reference pulse has not occurred, the program proceeds to a step 82 where the value of the dynamic dwell period is limited to a predetermined maximum value. At this time, it is assumed that the engine is substantially steady state and the dynamic dwell is set to zero. Next, at step 84, the program proceeds to determine the value of the steady state or static dwell. This dwell may be determined as a ROM stored function of engine speed or may be a single calibration constant representing the time required for the current through the primary winding 32 to increase to a predetermined value after the transistor 30 is turned on. Following step 84, the program proceeds to a step 86 where the dwell word is set equal to the sum of the dynamic and static dwell times. When the engine has been operating steady state, the dwell word will be equal to the static dwell time since the dynamic dwell time is set to zero. Thereafter, at step 88, the dwell period represented by the dwell word is limited to the reference period measured between reference pulses minus the minimum discharge time of the primary winding 32. For example, the dwell period represented by the dwell word may be limited to the measured reference period minus 600 microseconds which is the time required for the primary winding 32 to fully discharge. Thereafter, the program exits the routine at step 90 and proceeds to the routine at step 70 of FIG. 5 to determine the ignition timing word.

Assuming the vehicle operator now initiates engine acceleration and the change in the old and new filtered manifold pressure values is greater than the calibration constant K as determined at decision point 78, the program proceeds from the decision point 78 to a step 92 where the dynamic dwell period is set to its maximum value. This maximum value may be determined in accord with a schedule stored in the ROM 14 as a function of engine speed represented by the measured period between reference pulses. For example, the dynamic dwell may have greater values at low engine speeds where the greatest engine acceleration can occur.

Following step 92, the program proceeds to the step 82 where the dynamic dwell is limited to a predetermined maximum value. At step 86, this dynamic dwell time is added to the static dwell time determined at step 84.

Thereafter, as long as the change in manifold pressure is greater than the constant K as determined at step 78, the dynamic dwell is maintained at its maximum value. However, any time the change in manifold pressure is below the value K, the dynamic dwell period is decayed toward zero as limited by the actual engine acceleration determined by measuring the change in the period between reference pulses. This is accomplished by reducing the value of the dynamic dwell time each time a new reference pulse is detected as limited by the value of engine acceleration. When a new reference period is entered as determined at decision point 80, the program proceeds to a step 94 where any dynamic dwell value is reduced by a predetermined amount which may be a fraction of the remaining value of the dynamic dwell. From step 94, the program proceeds to a decision point 96 where the dynamic dwell is compared with the change in the reference period during engine acceleration, which change is representative of the amount that the dwell may be shortened by the ECU 18 in order to minimize ignition timing error. Alternatively, the dynamic dwell may be compared to a multiple of the change in the reference period to ensure that the resulting dwell time is adequate to provide spark ignition during engine acceleration. If the reduced dynamic dwell is greater than the change in the reference period during acceleration, the program proceeds to the step 82 where the dynamic dwell is limited to a predetermined maximum. However, if at any time the dynamic dwell is less than the change in the reference period, the program proceeds to a step 98 where the dynamic dwell is set equal to the change in the reference period (or multiple thereof) so as to ensure that the steady state dwell period is increased by at least the change in the reference period which is the amount that the dwell period may be shortened by the ECU 18 to minimize spark timing error. Thereafter, the program proceeds to the step 82 where the dynamic dwell is limited to the predetermined maximum value.

In general, the routine of FIG. 6 senses the oncoming engine acceleration by measuring the change in manifold pressure and sets the dwell word to a determined static dwell plus a maximum dynamic dwell value and thereafter when the change in manifold pressure decreases below the predetermined value reduces the dynamic dwell value toward zero. At all times the dynamic dwell is maintained at least equal to the change in the value between reference pulses. This ensures adequate dwell periods during engine acceleration even though the dwell time represented by the dwell word supplied to the ECU 18 may be shortened to minimize spark timing error. In addition the dwell provided during steady state engine operating conditions is not excessive so as to minimize the power dissipation in the electronic ignition system.

Referring to FIG. 7, the routine for computing the advance time at step 70 of FIG. 5 is illustrated. This routine is entered at step 100 and proceeds to a step 102 where a main advance spark angle is obtained from a lookup table stored in the ROM 14. The spark advance angle stored in the lookup table may be obtained at address locations derived from engine parameters that may include engine speed and engine load. After obtaining the main advance spark angle from the lookup table, the program proceeds to a step 104 where a coolant advance angle derived as a function of coolant temperature is obtained from a lookup table in the ROM 14 and added to the main advance angle determined at step 102. At step 106, a start-up advance angle is retrieved from a lookup table that may be addressed as a function of engine coolant temperature and added to the advance angle derived at step 104. Additional parameters may be included in determining the final spark advance angle, the three parameters described being utilized for illustration purposes only.

Following step 106, the program proceeds to step 108 where the program limits the amount of increase in advance in accord with one aspect of this invention to a predetermined value so as to prevent the excessive shortening of the dwell angle as illustrated in FIG. 4b.

The result of the determination of the dwell and advance time words by the program routines in FIGS. 6 and 7 is illustrated in FIGS. 2c, 3c and 4c. In FIG. 2c, a static dwell word representing the dwell period $D_1$ is supplied to the ECU 18 prior to the engine acceleration. After time $t_2$, the engine acceleration is sensed at decision points 78 or 96 resulting in the MPU adding a dynamic dwell time $t_6$ minus $t_9$ to the static dwell time $D_1$. The ECU 18 responds to the increase in the called for dwell period and initiates the EST signal at time $t_9$. The resulting EST signal supplied to the transistor 30 provides a dwell time from $t_9$ to $t_8$ that is sufficient to charge the primary winding 32 to the required energy level for spark ignition. Similarly, after acceleration is sensed in the illustration of FIG. 3c, a dynamic well value equal to $t_6$ minus $t_{10}$ is added to the static dwell value of $D_2$ resulting in the EST signal being initiated at time $t_{10}$ prior to the time $t_6$ to provide the required dwell time for charging the primary winding 32.

In FIG. 4c, when the change in advance from $A_2$ to $A_3$ was called for in steps 102 through 106 of FIG. 7, step 108 limited the change in advance resulting in termination of the electronic spark timing signal at time $t_6$ so that the time duration of the EST signal is adequate to charge the primary winding 32 to the desired energy level.

The above description of a preferred embodiment for the purpose of illustrating the invention is not to be considered as limiting the invention since many modifications may be made by the exercise of skill in the art without departing from the scope of the invention.

The embodiments of the invention in which an exclusive property or privilege is claimed are defined as follows:

1. Apparatus for generating dwell and ignition timing values in an electronic spark control system for an internal combustion engine, the electronic spark control system including an ignition coil and being characterized in that ignition dwell and spark timing are provided in response to dwell and ignition timing values and an estimated period between reference pulses provided at a predetermined engine crank shaft angle relative to each top dead-center position and further characterized in that the spark timing error introduced by the error between the actual and estimated period between reference pulses resulting from engine acceleration is minimized by shortening the dwell period, the apparatus comprising:

means responsive to engine operating parameters including engine speed effective to provide the spark timing value representing a spark ignition interval of time relative to the reference pulses producing a desired ignition angle at the current engine speed; and means effective to provide the dwell value representing a dwell period for energizing the ignition coil, the last mentioned means including means effective to generate a static dwell value representing a desired dwell period, means effective to sense engine acceleration, means responsive to a sensed engine acceleration effective to generate a dynamic dwell value representing at least the time that the dwell period may be shortened to minimize spark timing error, and means effective to sum the static and dynamic dwell values to produce the dwell value, whereby during steady state engine speeds, the dwell period is equal to the static dwell value to minimize power dissipation in the electronic spark control system and is the sum of the static and dynamic dwell values during engine acceleration to ensure that the desired dwell period is provided during engine acceleration where ignition timing error is minimized by shortening the dwell period.

2. Apparatus for generating dwell and ignition timing values in an electronic spark control system for an internal combustion engine, the electronic spark control system including an ignition coil and being characterized in that ignition dwell and spark timing are provided in response to dwell and ignition timing values and an estimated period between reference pulses provided at a predetermined engine crank shaft angle relative to each top dead-center position and further characterized in that the spark timing error introduced by the error between the actual and estimated period between reference pulses resulting from engine acceleration is minimized by shortening the dwell period, the apparatus comprising:

means responsive to engine operating parameters including engine speed effective to provide the spark timing value representing a spark ignition interval of time relative to the reference pulses producing a desired ignition angle at the current engine speed;

means effective to generate a static dwell value representing a desired dwell period;

means effective to generate a dynamic dwell value at least equal to the error between the actual and estimated period between reference pulses resulting from engine acceleration; and means effective to sum the static and dynamic dwell values to produce the dwell value, whereby during steady state engine speeds, the dwell period is equal to the static dwell value to minimize power dissipation in the electronic spark control system and is the sum of the static and dynamic dwell values during engine acceleration to ensure that the desired dwell period is provided during engine acceleration where ignition timing error is minimized by shortening the dwell period.

3. Apparatus for generating dwell and ignition timing values in an electronic spark control system for an internal combustion engine having an intake manifold, the electronic spark control system including an ignition coil and being characterized in that ignition dwell and spark timing are provided in response to dwell and ignition timing values and an estimated period between reference pulses provided at a predetermined engine crank shaft angle relative to each top dead-center position and further characterized in that the spark timing error introduced by the error between the actual and estimated period between reference pulses resulting from engine acceleration is minimized by shortening the dwell period, the apparatus comprising:

means responsive to engine operating parameters including engine speed effective to provide the spark timing value representing a spark ignition interval of time relative to the reference pulses producing a desired ignition angle at the current engine speed;

means effective to sense the pressure in the intake manifold;

means effective to generate a static dwell signal having a value representing a desired dwell period for energizing the ignition coil;

means effective to generate a dynamic dwell signal having a value representing at least the maximum time that the dwell period may be shortened to minimize spark timing error when the rate of change in the sensed manifold pressure exceeds a predetermined value;

means effective to decay the dynamic dwell value when the rate of change in the sensed manifold pressure decreases below the predetermined value;

means effective to limit the minimum value of the dynamic dwell signal at least to the error between the actual and estimated period between reference pulses; and means effective to sum the static and dynamic dwell values to produce the dwell value, whereby during steady state engine speeds, the dwell period is equal to the static dwell value to minimize power dissipation in the electronic spark control system and is the sum of the static and dynamic dwell values during engine acceleration to ensure that the desired dwell period is provided during engine acceleration where ignition timing error is minimized by shortening the dwell period.

4. Apparatus for recurrently generating dwell and ignition timing values in a digital electronic spark control system for an internal combustion engine, the spark control system including an ignition coil and being characterized in that ignition dwell and spark timing are provided in response to dwell and ignition timing values and an estimated period between reference pulses provided at a predetermined engine crank shaft angle relative to each top dead-center position and further characterized in that the spark timing error introduced by the error between the actual and estimated period between reference pulses resulting from engine acceleration is minimized by shortening the dwell period, the apparatus comprising:

means responsive to engine operating parameters including engine speed effective to recurrently provide the spark timing value representing a spark ignition interval of time relative to the reference pulses producing a desired ignition angle at the current engine speed, the last mentioned means including means effective to limit the change between spark timing values recurrently provided in an ignition advance direction to a predetermined maximum; and means effective to provide the dwell value representing a dwell period for energizing the ignition coil, the last mentioned means including means effective to generate a static dwell value representing a desired dwell period, means effective to sense engine acceleration, means reponsive to a sensed engine accleration effective to generate a dynamic dwell value representing at least the time that the dwell period may be shortened to minimize spark timing error, and means effective to sum the static and dynamic dwell values to produce the dwell value.

* * * * *